Sept. 13, 1955    W. I. NISSEN    2,717,720
INJECTION VALVE WITH PIERCING PIN FOR
USE WITH DISPOSABLE CARTRIDGES
Filed June 20, 1952    3 Sheets-Sheet 1
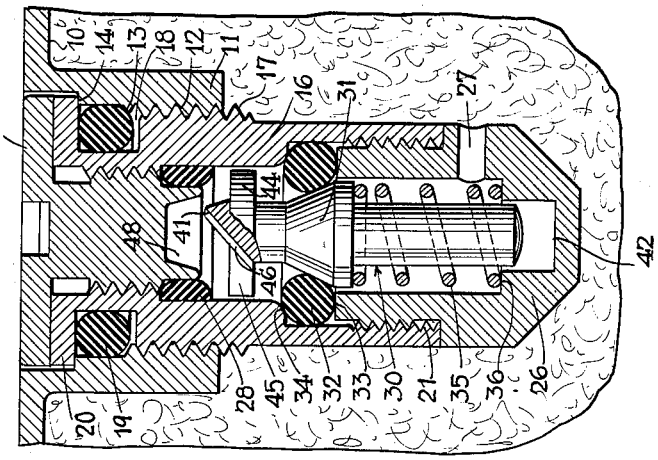
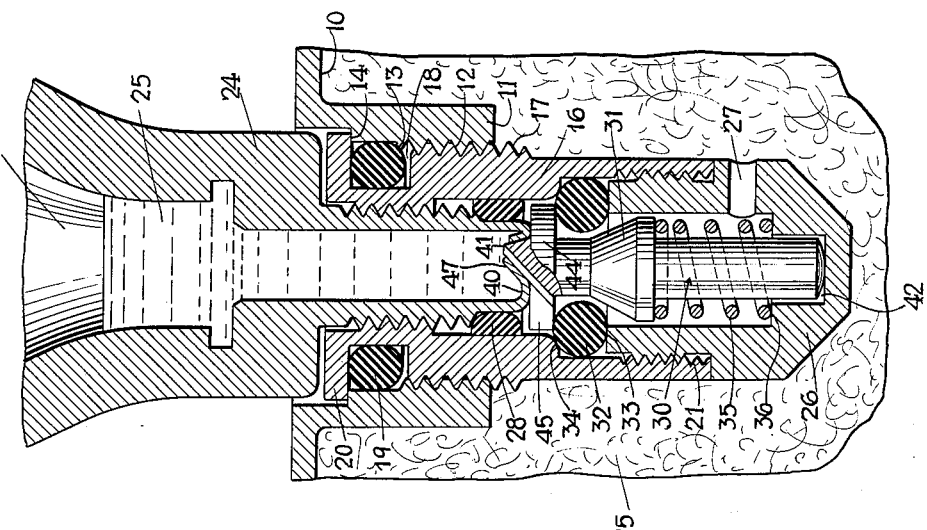
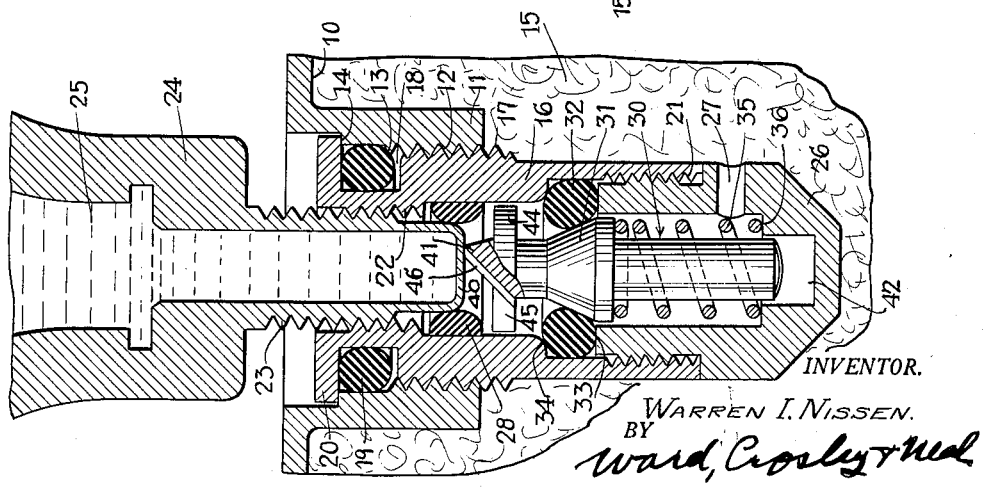
INVENTOR.
WARREN I. NISSEN.
BY
Ward, Crosley & Neal
ATTORNEYS.

Sept. 13, 1955

W. I. NISSEN 2,717,720

INJECTION VALVE WITH PIERCING PIN FOR
USE WITH DISPOSABLE CARTRIDGES

Filed June 20, 1952

INVENTOR.
WARREN I. NISSEN.
BY
Ward, Crosby & Neal
ATTORNEYS.

Sept. 13, 1955  
W. I. NISSEN  
2,717,720  
INJECTION VALVE WITH PIERCING PIN FOR  
USE WITH DISPOSABLE CARTRIDGES  
Filed June 20, 1952  
3 Sheets-Sheet 3
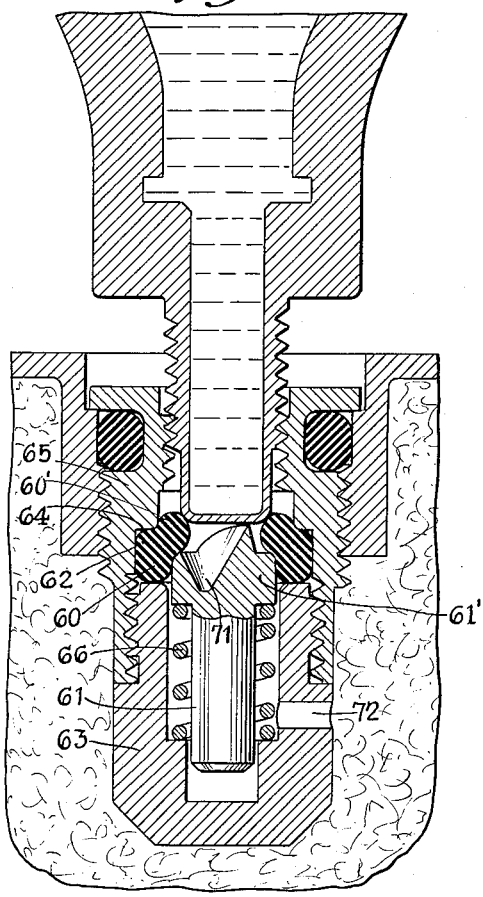
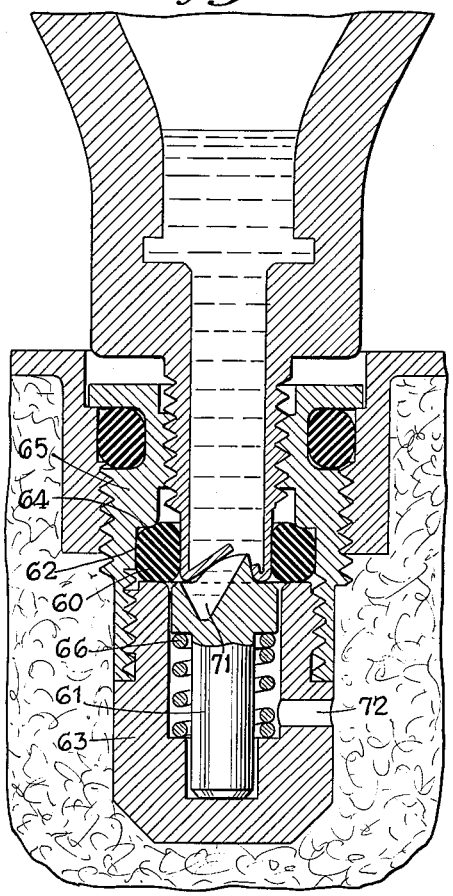
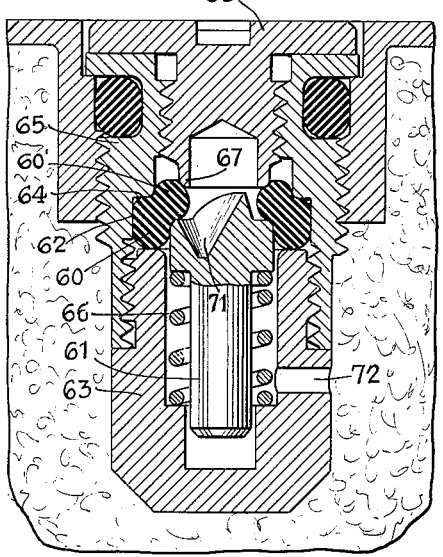
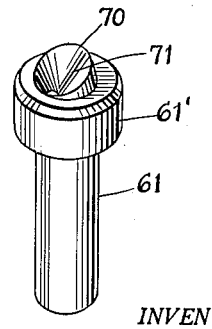
INVENTOR.
WARREN I. NISSEN.
BY
Ward, Crosby & Neal
ATTORNEYS.

United States Patent Office 2,717,720
Patented Sept. 13, 1955

2,717,720

INJECTION VALVE WITH PIERCING PIN FOR USE WITH DISPOSABLE CARTRIDGES

Warren I. Nissen, Basking Ridge, N. J., assignor to Ronson Corporation, Newark, N. J., a corporation of New Jersey Application June 20, 1952, Serial No. 294,640

8 Claims. (Cl. 222—82)

This invention relates to valves and more particularly valves of the class adapted for use in the injection of fluid under pressure from containers therefor into reservoirs for receiving and using same.

The invention, although adapted for a variety of uses, will be described in a form suitable for embodiment as an injection valve in the wall of the fuel receptacle of a cigar or cigarette lighter of the type adapted to utilize fuel in the form of gas supplied from disposable cartridges. Valves for this purpose often incur the difficulty of causing "chipping" of metal from the cartridge nozzle, such chipping resulting in leakage of the valve when the metal chips become lodged between or around the relatively movable parts of the valve. The invention provides a valve member which will puncture the end of the nozzle of the disposable cartridge without any danger or likelihood of such chipping and at the same time a valve construction is provided with which leakage troubles heretofore encountered are avoided; also one for which the parts may be readily made inexpensively by volume production methods, and further a construction which is especially easy and convenient to repair or replace when desired.

With one embodiment of the invention these results are accomplished, as will be hereinafter further described, by using a novel double sealing arrangement, one for sealing and shutting off any possible leakage from around the nozzle of the fuel cartridge, and the other for normally maintaining the injection valve itself in securely shut off condition. With another form of the invention these results are accomplished with a single sealing means which fulfills both of these functions. Avoidance of chipping of the cartridge nozzle is accomplished by using a novel type of piercing pin which punctures the end of the cartridge nozzle along a predetermined line and concurrently bends a small flap-like portion of the metal inwardly without cutting off any chips from the nozzle metal, and as the cartridge is screwed into place and thus pierced, the piercing pin is also caused to rotate with the nozzle so that the piercing pin merely cuts into the nozzle by reason of endwise pressure, but cannot slice away any chips since the nozzle and pin rotate and move together, except for the endwise piercing action.

Other and more specific objects, features and advantages of the invention will appear from the detailed description given below, taken in connection with the accompanying drawings which form a part of this specification and illustrate by way of example the presently preferred embodiments of the invention.

In the drawings:

Fig. 1 is a vertical sectional view of a preferred embodiment of the invention showing the injection valve as mounted in a wall of a cigar or cigarette lighter fuel compartment by way of example, a removable cartridge being shown in vertical section partly broken away and in the position which it assumes just before the cartridge nozzle is pierced;

Fig. 2 is a view similar to Fig. 1 showing the relationship of the parts just after the cartridge nozzle has been pierced;

Fig. 3 is another view similar to Figs. 1 and 2, but showing the valve parts in the position which they will assume after the disposable cartridge has been removed and replaced by a closure cap;

Figs. 7, 8 and 9 respectively are vertical sectional views similar to Figs. 1, 2 and 3, but illustrating alternative embodiments of the invention; and Fig. 10 is a perspective view of a piercing pin adapted for use with the form of invention shown in Figs. 7 to 9 inclusive.

Figure 6:
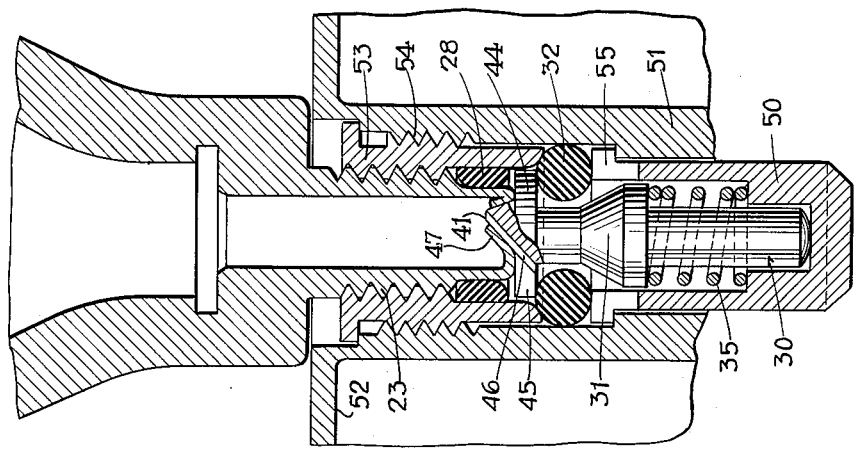
Fig. 6 is a view of the embodiment of Fig. 5 shown in connection with a disposable cartridge nozzle which has just been pierced.
Figure 5:
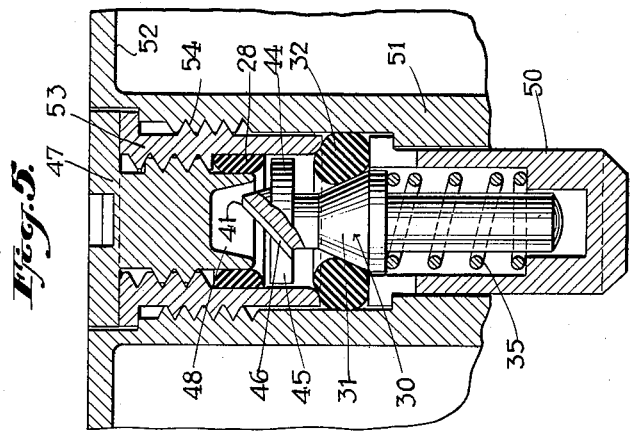
Fig. 5 is a view similar to Fig. 3, but showing a somewhat different embodiment of the invention.

The construction as shown in Figs. 1–3 is adapted to be inserted or removed from a container as an assembled unit, whereas the embodiment shown in Figs. 5 and 6 has its outer shell portion formed as an integral part of a container such as a lighter which is to receive and contain gas. The removable unitary assembly of Figs. 1–3 has a number of parts such that its use is generally limited to those items which have ample interior space or thickness easily to accommodate such parts. For items such as small lighters which, because of their styling or thinness could not readily accommodate that construction, one may use the embodiment of the invention shown in Figs. 5 and 6, or a similar construction with a sealing means of the type shown in Figs. 7 to 9.

Referring now in further detail to the construction of Figs. 1–3, a wall portion 10 of the fuel reservoir of a lighter, for example, is here shown as formed with an integral inwardly directed bushing 11. The lower interior portion of this bushing is threaded as at 12 and above the threads two shoulders as at 13 and 14 are provided. In case the fuel reservoir is for a lighter, same may be packed with cotton 15 or other suitable material through the opening in bushing 11 before the valve unit is inserted. The valve assembly as shown comprises a tubular housing 16 having an external thread 17 which is engaged by the thread 12 of bushing 11. Just above the threaded portion 17 an annular groove 18 is provided to receive a static O ring 19, of resilient material such as a suitable artificial rubber which is clamped into a somewhat oval cross-sectional shape as shown, between member 11 and portions of the housing 16. An effective tight seal is thus provided between the receptacle wall and the upper portion of the valve assembly.

The housing member portion 16 is also formed with a lower interior threaded portion 21 and an upper interior threaded portion 22. Thread 22 is adapted for threaded engagement with the threaded nozzle portion 23 on a disposable cartridge 24 which contains fuel or other fluid under pressure which is to be transferred into the reservoir 10. The cartidge, in case it is to be used for supplying lighters with fuel may contain, for example, butane maintained under sufficient pressure so that it is partially or wholly in liquid form, such pressure being maintainable by including in the cartridge a so-called pressurizing gas such as nitrogen as indicated at 25' in Fig. 2.

The interior thread 21 at the lower end of the valve housing is adapted to receive the threaded upper end of a valve cap portion 26. This cap portion, as shown, has at its side an opening or slot 27 through which the butane or other fluid to be charged into the reservoir escapes from the valve into the reservoir.

Just below the threaded portion 22 in the valve housing a packing ring 28 is provided, preferably in the form of an O ring with its outer peripheral half absent or cut away so that it is of D-shaped cross-section. This as well as the O ring 19 is made of suitable resilient material whereby it will embrace the nozzle of the disposable cartridge when the latter is inserted as shown in Figs. 1 and 2 and prevent any leakage of fuel past the threads 22, 23.

The piercing pin member of the valve is shown at 30. This is formed intermediate its upper and lower ends with a downwardly and outwardly inclined shoulder portion 31 adapted normally to be embraced by another O ring 32 which engages said inclined shoulder and is also held in an annular cavity formed between the upper end 33 of the valve cap 26 and a shoulder 34 formed on the interior of the valve housing member 16.

The piercing pin 30 is normally urged upwardly by a helical spring 35 encircling the lower portion or shank of the piercing pin, such spring bearing at its lower end against a portion in the valve cap and at its upper end against the lower side of shoulder portion 31 on the piercing pin.

Referring now to Fig. 2, as here shown, the cartridge nozzle has been screwed into the valve housing until the end wall 40 of the nozzle has been engaged and pierced by the upper end portion 41 of the piercing pin. It will be here noted that the lower end of the cartridge nozzle protrudes through and is in a position to be firmly embraced by the D ring 28, this ring being at the same time forced outwardly firmly against the interior walls of the valve housing member, thus effectively sealing the valve against any escape of gas around about the exterior of the nozzle during the further manipulations of the valve and cartridge. This seal in fact becomes effective before the piercing pin is depressed far enough to have its inclined shoulder portion 31 move down away from the O ring 32.

Figure 4:
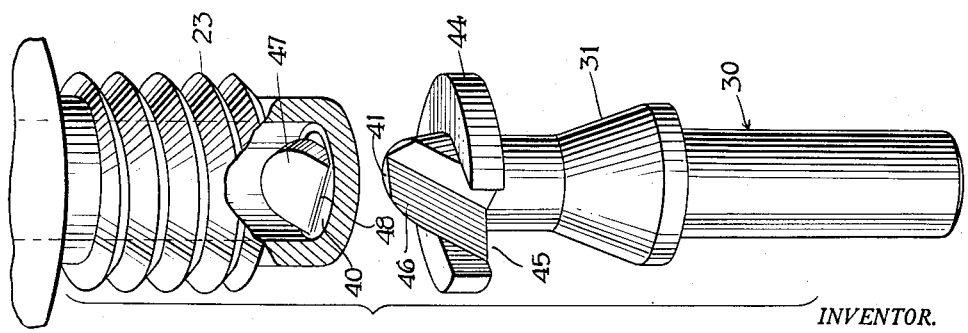
Fig. 4 is an enlarged perspective view of the piercing pin element of the valve and of the end portion of the disposable cartridge nozzle which has just been pierced by the piercing pin.

With the parts as shown in Fig. 2, the fluid under pressure in the cartridge will, because of the shape of the piercing pin member as shown in Fig. 4, be free to pass down along the piercing pin element and out through opening or slot 27. Between the time when the piercing pin is in the position shown in Fig. 1, and the time when it pierces the cartridge nozzle as shown in Fig. 2, it will have been forced to a stop in the cap 26 by reason of the engagement of its lower end with the interior bottom surface 42 of the valve cap. During this time also the inclined or tapered shoulder portion 31 of the piercing pin moves away from O ring 32, thus allowing the escape of fluid down through this O ring which previously had formed a seal with the inclined shoulder portion 31.

As to the preferred shape of the upper portion of the piercing pin member, reference will be now made particularly to Fig. 4. That is, the upper portion of this member is formed with a shoulder 44 having a cut-out portion at 45 forming a fluid passage, the shoulder 44 as shown in Fig. 2, also being adapted to be engaged by the lower end of the cartridge nozzle as the latter becomes pierced and forming a stop limiting the inward threading of the nozzle as soon as the piercing pin is depressed to its lowermost position. This shoulder 44 also provides a stop limiting downward movement of the D ring member 28 and also serves to thrust such ring upwardly from the position shown in Fig. 2 to a higher position after the cartridge nozzle is removed. The uppermost tip 41 of the piercing pin member, as shown in Fig. 4, preferably is of a semi-circular knife-like form. The metal just below the knife-like portion 41 is preferably cut away as at 46 to provide a downwardly and outwardly directed passage of V-shaped cross-section. It is apparent that when the knife-like portion 41 is thrust up against the lower end of the end wall 40 of the nozzle, then a flap-like tab 47 will be cut out (as shown in Fig. 4) from the metal of the nozzle end 40, this tab being bent upwardly, as shown, substantially about a line 48. And since, as a cartridge nozzle is being screwed down firmly into place, the piercing pin member 30 is free to rotate, it will be apparent that the end of the nozzle will be cut or pierced as shown in Fig. 4, only by reason of endwise pressure against the piercing pin, and any tendency of slicing or cutting off of any chips from the nozzle will be prevented because the piercing pin is free to turn and thus will not act as a rotary cutter.

Referring to Fig. 3, the parts are in the relative positions assumed after the disposable cartridge has been screwed out of place and the piercing pin member has again been forced up by spring 35 into position such that its inclined shoulder portion 31 forms a seal with O ring 32. As a further safeguard against any slight leakage from the reservoir which might occur past such seal, a removable cover or cap 47 is preferably finally screwed into place in the location previously occupied by portions of the cartridge nozzle. The lower end of the cap 47 may be formed with a depending flange portion 48 adapted to come into sealing engagement with the D ring sealing member 28 in a manner firmly to press radially outwardly against the interior of such member and cause its exterior to be pressed against the interior wall of the valve housing member 16.

In the embodiment shown in Figs. 5 and 6 parts like those referred to above are identified by the same numerals. However, in place of the valve cap member 26 of Fig. 1, there is provided in Figs. 5 and 6 a bushing-like member 50 so designed that the fluid instead of escaping through a hole or a slot at the side, escapes around and between the member 50 and the inside surface of a tubular portion 51 forming an integral part of the reservoir wall 52. In Figs. 5 and 6 an upper bushing member 53 is provided having internal threads for receiving alternatively the cartridge nozzle or the cap 47. This bushing externally has threaded engagement as at 54 with the tubular portion 51 of the reservoir wall.

When the cartridge nozzle is pierced, as shown in Fig. 6, the fluid passes down over the upper end of the piercing pin member in the same manner as in Fig. 2, thence through the interior of O ring 32, thence through radial slots as at 55 in the upper end of the member 50 and down past the exterior of the latter member into the reservoir.

With the form of the invention shown in Figs. 7 to 10, a single O ring 60 is so mounted and arranged as to normally provide a sealing means about the upper end of a piercing pin 61, and to also provide a sealing means for embracing the cartridge nozzle when the latter is screwed into place to be pierced. With this arrangement the O ring 60 is placed within an annular cavity 62 provided between the upper end of cap portion 63 and an internal shoulder 64 formed in a housing member 65. This annular cavity 62 is of such size in comparison with the O ring 60 as shown in Fig. 9 that normally a considerable portion of the inner part of the O ring as at 60' will bulge to an inward and upwardly directed position by reason of engagement therewith of a shoulder portion 61' formed at the upper end of the piercing pin member 61. That is, such shoulder portion 61' will be urged up into sealing relation with the O ring by reason of the spring 66 surrounding the stem of the piercing pin.

Also normally when the valve is closed an annular extension 67 formed on the lower end of the dust cap or closure screw 68 will engage against the O ring portion 60' and thus insure that this portion will be pressed firmly in sealing engagement with both the shoulder 64 on the member 65 and with the upper outer edge of the shoulder 61' on the piercing pin.

When the cap 68 is removed and the cartridge nozzle is screwed into place instead of the cap as shown in Fig. 7, before such nozzle comes into position to be pierced it will engage in sealing relationship the portions 60' of the O ring. Then as shown in Fig. 8, as the cartridge nozzle is screwed down further to the position where it is pierced it will become very firmly embraced by the inwardly protruding portions of the O ring, thereby causing the outer portions of the O ring to apply firm pressure against the walls of the annular groove 62, insuring a complete and effective seal about the cartridge nozzle while the same is being pierced and the gas is being discharged therefrom.

Then after the discharge of gas from the cartridge has been completed, as the cartridge is unscrewed from the valve, before its nozzle rises up out of the sealing engagement with the O ring, the piercing pin will be allowed to rise into sealing engagement therewith and finally back to the position shown in Fig. 9.

As shown in Fig. 10, the preferred form of piercing pin for the embodiment of Figs. 7 to 9, has a disk-like upper end or shoulder formed on the upper end of the stem portion. At the mid portion of the upper surface of this element an arcuate cutting edge 70 is provided to act in a manner similar to the portion 41 of the piercing pin 30 above described. As will be apparent from each of the Figures 7 to 10, a cavity with a general conical surface 71 is provided internally of the cutting edge 70, this conical surface being eccentric with respect to the axis of the piercing pin and being such as to provide clearance permitting gas to escape from the pierced nozzle past the peripheral edge of the nozzle, thence down along the sides of the piercing pin and through an opening 72.

The construction and operation of the parts of Figs. 7 to 10, except as above described, are similar to, and will be readily apparent from, the above description of Figs. 1 to 3. It will be understood further that if desired the construction of Figs. 7 to 9 may be contained in a tubular portion integral with the receptacle, similar to that shown at 51 in Fig. 5.

The mounting of the O ring such as at 60 in the manner shown in Figs. 7 to 9, has been found to provide a very effective and durable sealing means for two purposes, as above explained, and with a reduced number of parts, thus involving somewhat less expense for the construction and assembly thereof.

As above indicated, the valve constructions according to this invention may be used for purposes other than lighters and for the transfer or injection of various forms of liquid or gaseous fluid under pressure without leakage. This application forms a continuation-in-part of my application Serial No. 278,771 filed March 27, 1952, now abandoned.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. A valve assembly adapted to be mounted in a reservoir for receiving fluid under pressure from a disposable cartridge, the assembly comprising in combination: an internally threaded member adapted for threaded engagement with the cartridge nozzle; a piercing pin member; means for retaining said member within the valve assembly in a position substantially axially in alignment with the cartridge nozzle when screwed into place; a spring for yieldably retaining said piercing pin member in endwise engagement with such nozzle as the latter is screwed into place; said piercing pin member having a cutting edge shaped to cut and bend, inwardly of the end of the nozzle, a tab of the end closure thereof as such nozzle is screwed into place; and sealing means normally embracing said member for preventing fluid from the reservoir from flowing past the member and out of the valve assembly; said member having a portion located just inwardly of said cutting edge for engaging the nozzle end to cause said member to be moved axially against said spring out of embraced relationship with said sealing means to permit fluid from the nozzle when pierced to flow past said member into the reservoir; the piercing pin member being free to rotate with the nozzle during such cutting action.

2. In a valve assembly of the class described, a piercing pin member having on one end a cutting edge portion shaped to cut and bend inwardly a tab of the end closure of a cartridge nozzle, thread means in the assembly for receiving and holding such a nozzle upon insertion thereof and turning such nozzle, spring means for yieldably urging said piercing pin member with such cutting edge into engagement with the nozzle end during such turning, the piercing pin member being free to rotate with the nozzle end when the latter is turned, the shank of said piercing pin member being formed with an enlargement, an O ring sealing element normally embracing said enlargement, and said piercing pin member having a shoulder portion adapted to be engaged by the nozzle end when inserted to thrust the piercing pin inwardly of the valve and to thus move such enlargement out of sealing engagement with said O ring.

3. In a valve assembly of the class described, a piercing pin member having on one end a cutting edge portion shaped to cut and bend inwardly a tab of the end closure of a cartridge nozzle, thread means in the assembly for receiving and holding such a nozzle upon insertion thereof and turning such nozzle, a sealing ring of D shaped cross section within said means and adapted to seal the nozzle end, when inserted, with respect to said means, spring means for yieldably urging said piercing pin member with such cutting edge into engagement with the nozzle end during such turning, the piercing pin member being free to rotate with the nozzle end when the latter is turned, the shank of said piercing pin member being formed with an enlargement, an O ring sealing element normally embracing said enlargement, and said piercing pin member having a shoulder portion located just inwardly of the cutting edge and adapted to be engaged by the nozzle end when inserted to thrust the piercing pin inwardly of the valve and to thus move such enlargement out of sealing engagement with said O ring.

4. A valve assembly adapted to be mounted in a reservoir for receiving fluid under pressure from a disposable cartridge, such construction comprising in combination: an internally threaded member adapted for threaded engagement with the cartridge nozzle; a piercing pin member; means for retaining said member within the valve assembly in a position to rotate with such a nozzle when being screwed into place; a spring for yieldably urging said piercing pin member endwise in engagement with the end of the nozzle when being screwed into place; and an O ring sealing means mounted in a position whereby its inner portions are normally bulged inwardly to be engaged in sealing relationship by said piercing pin as urged into such engagement by said spring, said piercing pin having a shoulder portion adapted to be engaged by said nozzle when screwed into place whereby the pin is moved against the action of said spring out of sealing relationship with the ring, said inner portions of said ring then being in position to embrace the cartridge nozzle in sealing relation therewith.

5. A valve assembly adapted to be mounted in a reservoir for receiving fluid under pressure from a disposable cartridge, the construction comprising in combination: an internally threaded member adapted for threaded engagement with the cartridge nozzle; a piercing pin member; means for retaining said member within the valve assembly in a position substantially axially in alignment with the cartridge nozzle when screwed into place; a spring for yieldably retaining said piercing pin member in endwise engagement with such nozzzle as the latter is screwed into place; and O ring sealing means, the inner portions of which are normally engaged by said member under the pressure of said spring for forming a seal about said member preventing fluid from the rservoir from escaping past said member and out of the valve, said member having a shoulder portion for engagement by the nozzle and said member being movable, upon said engagement, axially against said spring and out of sealing relation with said ring to permit fluid from the nozzle when pierced to flow past said member into the reservoir, and said inner portions of said ring being in a position to embrace the nozzle in sealing relation thereto before the nozzle reaches piercing position.

6. In a valve assembly of the class described, a piercing pin member terminating with an endwise protruding cutting edge shaped to outline and cut a tab of the end closure material of a cartridge nozzle when applied thereto under pressure, said member having a shoulder formed thereon just inwardly of such cutting edge and adapted to be engaged by the peripheral portions of a cartridge nozzle to cause axial movement of such member as the nozzle is being pierced, a groove formation being provided and extending from within such cutting edge through such shoulder to provide an escape passage for fluid from the region of the cut tab down along outside said member.

7. In a valve assembly of the class described, a piercing pin member having a cutting edge at one end thereof for piercing the end closure of a compressed fluid cartridge nozzle, means in the assembly for receiving and holding such a nozzle upon insertion thereof, spring means for yieldingly urging said pin member into engagement with the nozzle end when the nozzle is inserted and a yieldable O-ring sealing means mounted in an annular cavity surrounding the region of engagement of the nozzle and pin member, with the inner portions of such ring bulging into the paths of the nozzle and pin member so as to normally embrace said member and prevent the escape of fluid through the valve assembly, said pin member being provided with a shoulder inwardly of said cutting edge for engagement with the nozzle when the latter is inserted whereby the pin member is caused to be moved against the action of said spring and out of embraced relationship with the inner portions of said ring thereby permitting fluid flow from the nozzle past said pin member into the reservoir, the said inner portions of the sealing ring then coming into embracing engagement with the nozzle to form a seal thereabout.

8. In a valve assembly of the class described, a piercing pin member for piercing the end closure of a cartridge nozzle, means in the assembly for receiving and holding such a nozzle upon insertion and turning thereof, spring means for yieldably urging said pin member into engagement with the nozzle end when the nozzle is inserted, a yieldable ring-shaped sealing means mounted in an annular cavity surrounding the region of engagement of the nozzle and pin, the inner portions of such ring bulging into the paths of the nozzle and pin, to normally form a seal about the pin, shoulder means provided on said pin member for engagement with said nozzle when inserted whereby the pin member is moved out of sealing relation with said yieldable ring, the ring then forming a seal about the nozzle, the bulging portions of the sealing ring being adapted to bear under pressure against such nozzle means in sealing relation thereto.

References Cited in the file of this patent

UNITED STATES PATENTS

| | | |
|---|---|---|
| 662,499 | Reenstierna | Nov. 27, 1900 |
| 2,021,603 | Kelley et al. | Nov. 19, 1935 |
| 2,120,297 | Reinecke | June 14, 1938 |
| 2,552,154 | Danielson | May 8, 1951 |
| 2,592,029 | Hansen | Apr. 8, 1952 |